(12) United States Patent
Kirk et al.

(10) Patent No.: US 6,239,808 B1
(45) Date of Patent: May 29, 2001

(54) METHOD AND APPARATUS FOR DETERMINING TEXTURE VALUES OF GRAPHICAL IMAGES

(75) Inventors: David Kirk, San Francisco; Curtis Priem, Fremont, both of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/054,954

(22) Filed: Apr. 3, 1998

(51) Int. Cl.[7] .................................................. G06T 17/00
(52) U.S. Cl. ......................... 345/430; 345/431; 345/432
(58) Field of Search ............................. 345/430, 431, 345/432

(56) References Cited

U.S. PATENT DOCUMENTS

| | | | |
|---|---|---|---|
| 5,361,386 | * 11/1994 | Watkins et al. | 345/430 |
| 5,651,104 | * 7/1997 | Cosman | 345/428 |
| 5,734,386 | * 3/1998 | Cosman | 345/430 |
| 5,801,708 | * 9/1998 | Alcorn et al. | 345/430 |

* cited by examiner

*Primary Examiner*—Mark Zimmerman
*Assistant Examiner*—Kimbinh T. Nguyen
(74) *Attorney, Agent, or Firm*—Oppenheimer, Wolff & Donnelly LLP; Claude A. S. Hamrick

(57) ABSTRACT

In a computer display system, a method for mapping textures to three dimensional surfaces divided into a one or more polygons including the steps of determining pixels to be utilized in describing a polygon, selecting a texture map having a scale chosen to reproduce accurately a texture value for pixels for a polygon, determining a plurality of texture coordinates of a pixel at a plurality of positions surrounding a center of the pixel, determining texture values at each of the determined positions, and blending the texture values at the points to produce a texture value for the pixel.

32 Claims, 6 Drawing Sheets

METHOD AND APPARATUS FOR DETERMINING TEXTURE VALUES OF GRAPHICAL IMAGES

BACKGROUND OF THE INVENTION

1. Field of the Invention

This invention relates to computer systems, and more particularly, to methods and apparatus for describing computer output images.

2. History of the Prior Art

In three dimensional graphics, surfaces are typically rendered by assembling a plurality of polygons in a desired shape. The polygons are conventionally triangles having vertices which are defined by three dimensional coordinates in world space, by color values, and by texture coordinates. Other characteristics such as transparency and additional textures may also define each vertex in a particular system to provide more sophisticated rendering. Such other characteristics may also be indexed and manipulated in accordance with the present invention. However, the description is limited to a smaller number of characteristics in order to help clarify the invention.

The surfaces represented by an assembly of polygons are, as a generality, being viewed in perspective. Consequently, the three dimensional world space coordinates are transformed into screen coordinates in which horizontal and vertical values (x, y) define screen position and a depth value z determines how near a vertex is to the screen and thus whether that vertex is viewed with respect to other points at the same screen coordinates. The color values define the brightness of each of red/green/blue (r, g, b) colors at each vertex and thus the color at each vertex. The texture coordinates (u, v) define the coordinates of each vertex on a texture map defined by values stored in memory.

The texture map describes a pattern to be applied to the surface of the triangle to vary the color in accordance with the pattern. The texture coordinates of the vertices of a triangular surface area define the position of the triangle on the texture map, the texture coordinates determine the texture applied to each portion of the surface within the triangle. In turn, the three dimensional coordinates of the vertices of a triangle positioned on the texture map define the plane in which the texture map and the surface lie with respect to the screen surface.

In order to provide the data to be stored in a frame buffer by which a triangle may be drawn on the two dimensional screen, the screen vertices of the particular triangle are first determined from the world three dimensional coordinates. Once the vertices of a triangle have been defined in screen space, the triangle is positioned in screen space so that all of the pixels defining that triangle are determined.

Since the original triangle lies in a plane in world space, the depth of its vertices vary linearly in world space from one to the other within the triangle. This allows the depth value for each position in the triangle to be determined in world space by a linear interpolation process. The depth of each pixel which defines the triangle projected onto the screen may be determined by perspective transformation using algorithms well known to those skilled in the art. Similarly, the color values and the texture coordinates for each pixel defining the triangle vary linearly from vertex to vertex in world space; and the same type of linear interpolation process in world space and perspective transformation back to screen space may be used to find the color values and texture coordinates for each pixel in screen space. Once the depth values, color values, and texture coordinates for each pixel have been determined in screen space, the texture coordinates are utilized to determine texture values from the texture map; and these texture values are utilized to modify the color values of each pixel in the triangle.

The texture coordinates u and v of each pixel provide an index into a map of texture values typically stored in memory which together describe a particular texture pattern that is to be applied in world space to the surface of the triangle. If a texture map describes a brick wall, for example, then a texture value may be derived using the u and v coordinates of the pixel which value reflects how the brick texture appears at that position on the texture map and the triangle. This texture value is then used to modify the r, g, b color values determined for that position on the triangle.

Since each individual screen pixel describing the triangle covers some portion of the texture map as it is projected onto the screen, each screen pixel will cover some one or more texture values on the projected triangle. Texture coordinates obtained by the interpolation and perspective transformation processes are not typically integer values. On the other hand, indexing into a texture map is accomplished using integral coordinates. Consequently, non-integral coordinates obtained by interpolation and perspective transformation must somehow be used for indexing to obtain texture values. A simple method of obtaining texture values uses the closest integral u and v values for each pixel to index into the texture map and selects the value at that intersection. A more accurate method of representing the texture pattern utilizes the integer portion of the u and v coordinates for each pixel to index into the texture map, and then uses the fractional portion in a process called bilinear interpolation to provide weighted amounts of the texture values (texels) in the texture map closest surrounding the central point reached by indexing. These fractional portions (typically the four values closest to this intersection) are combined and blended into a more accurate representation for modifying the pixel color values to reproduce the texture pattern.

Those skilled in the art have recognized that where a pixel covers a very large number of texture values on a texture map, only a small portion of those values will be represented in the texture value selected to modify the color of that pixel using the bilinear interpolation method. Consequently, a more accurate method of texture mapping has been devised. The method provides texture maps at a plurality of different scales so that the pixels defining the individual triangles may be made to cover relatively constant numbers of texels in the projection of the texture map in screen space. The process of selecting a texture value for a pixel then includes an initial step for each particular triangle being rendered in which a texture map is selected having a scale adapted to accurately represent texture values for the pixels of that triangle. By choosing the correct scale for the texture map relative to pixel size, a pixel on the screen may be made to cover only a few texels so that the texture values selected for combining to define a resulting texture value for each pixel provide a more faithful value than is possible using either of the simpler methods. The process is described in a paper entitled "Pyramidal Parametrics," presented at Siggraph proceedings, 1984.

In order to make the scale selection process more accurate, an additional process by which texture maps of the two closest scales to a desired pixel to texel size are selected are selected, and the texture values provided by those two different texture maps are interpolated to provide values closer to the desired scale.

Although these methods provide progressively more accurate forms of rendering pixels on the screen if the triangle lies in a plane parallel to the screen surface, each of these methods is based on the assumption that the projection of a pixel onto the texture map is square or rectangular in shape and aligned to the same axes as is the texture map. This assumption is incorrect in the greater number of cases when three dimensional shapes are being rendered. For example, these methods are less than representative if the vertices of the triangle being mapped are at significantly different depths so that pixels describing a scan line are warped and of different sizes when projected onto the triangle. In fact, none of these methods is capable of describing with sufficient accuracy the texture values which should be attributed to the pixels when three dimensional shapes are rendered in any significant perspective on a flat screen surface.

It is desirable to provide a method for more realistically mapping texture values to pixels representing three dimensional shapes than has been possible with prior art methods.

SUMMARY OF THE INVENTION

It is, therefore, an object of the present invention to provide an improved method for more realistically mapping texture values to pixels representing three dimensional shapes.

These and other objects of the present invention are realized by a method for mapping textures to three dimensional surfaces divided into one or more polygons including the steps of determining pixels to be utilized in describing a polygon, selecting a texture map having a scale chosen to reproduce accurately a texture value for pixels for a polygon, determining a plurality of texture coordinates of a pixel at a plurality of positions surrounding a center of the pixel, determining texture values at each of the determined positions, and blending the texture values at the points to produce a texture value for the pixel.

These and other objects and features of the invention will be better understood by reference to the detailed description which follows taken together with the drawings in which like elements are referred to by like designations throughout the several views.

DETAILED DESCRIPTION

Figure 1:
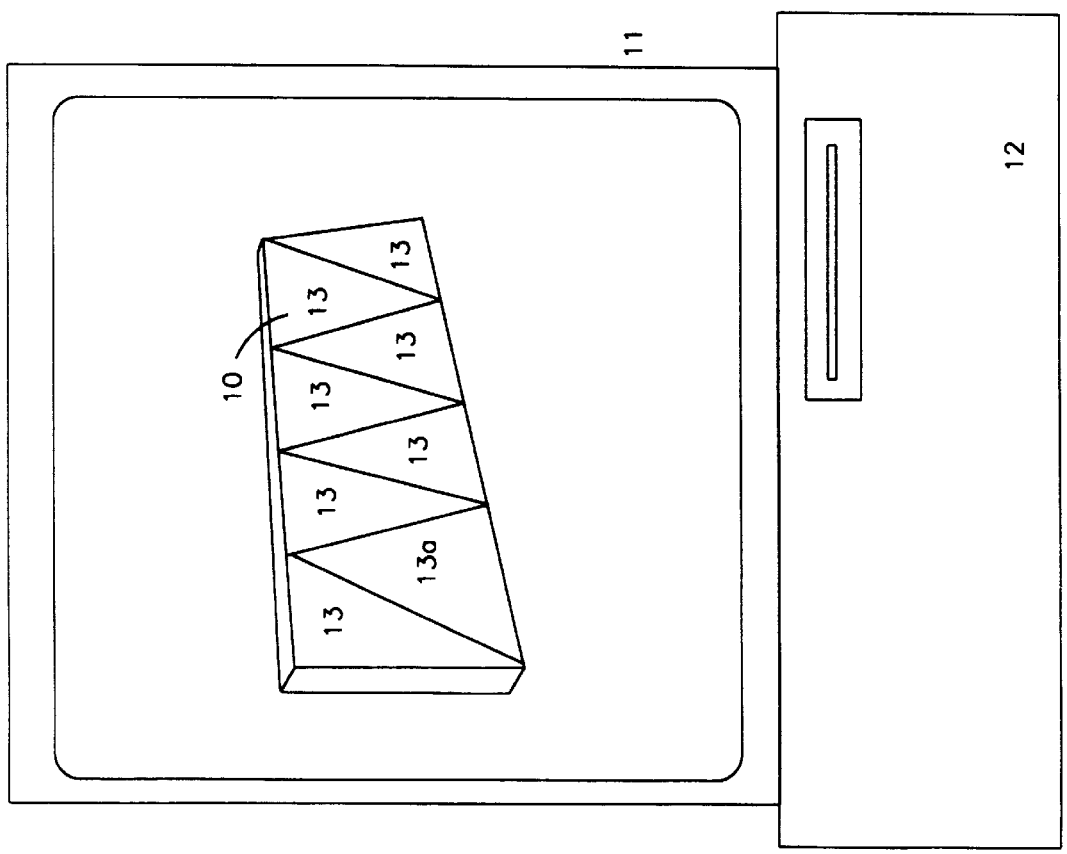
FIG. 1 illustrates a three dimensional object rendered on a computer display utilizing polygons.

FIG. 1 illustrates a three dimensional object having a surface 10 displayed on an output display 11 of a computer 12. The surface 10 is typically described by a plurality of polygons 13 which are usually triangles. The use of a plurality of polygons 13 allows a variegated surface to be described by relatively simple approximations of individual areas of the surface 10. The screen projection of one of these polygons 13a (also referred to as triangle 13a) has been enlarged in FIG. 2 in order to illustrate the manner in which it and the other polygons are rendered in order to produce the surface 10.

It will be assumed for the purpose of this specification, that the surface 10 is some form of three dimensional multicolored textured surface. As may be seen, the triangle 13a which is a part of the surface 10 includes the usual three vertices each of which is usually defined by screen is coordinates x, y, z; color values r, g, b; and texture coordinates u, v. Typically, the x, y, and z values assigned by an application program define the position of each vertex in some general world space. The x and y world space coordinates are translated during the rendering process to screen space by algorithms of a perspective transformation process so that each vertex is positioned at some x distance along a horizontal screen axis and some y distance along a vertical screen axis. The z value which represents the depth of the particular vertex may be retained in a "z" or depth buffer or otherwise used to compare to the z values of other points which are mapped to the same x and y screen coordinates in order to determine which point is nearer the front of the screen and should therefore be shown (or assume some other frontal precedence).

It should be noted that when the z values for each of the vertices are the same, the triangle lies in a plane parallel to the screen surface and is undistorted. However, if the z values of the vertices differ, then the triangle is rendered on the screen in perspective which may or may not be apparent to one viewing the display depending on the other screen elements displayed simultaneously.

The color values r, g, and b define the brightness of each of the red, green, and blue colors at each vertex. In the absence of texture mapping, if the color values are all the same at each of the vertices, then the entire triangle 13a is of a single solid color. In the absence of texture mapping, if any of the color values is different at the three vertices, then the color of the triangle 13a varies across its surface.

Figure 2:
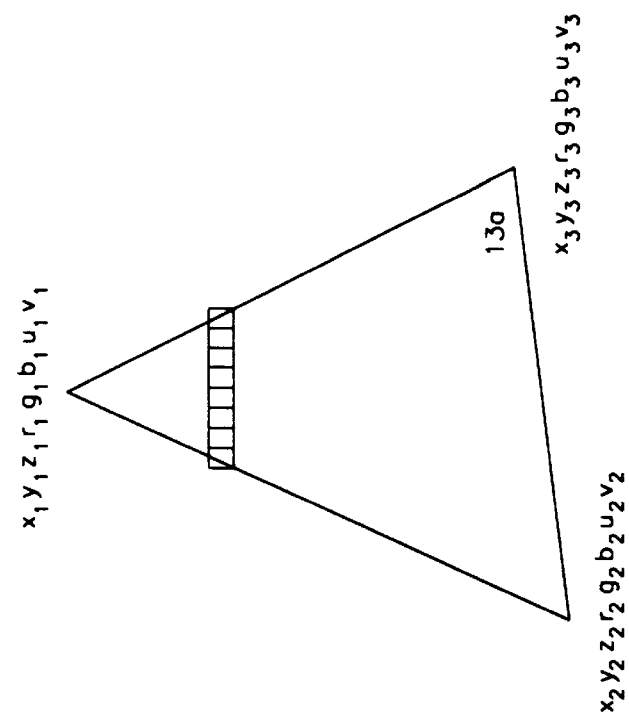
FIG. 2 is an enlargement of the projection on the screen of one of the polygons illustrated in FIG. 1.

In order to provide the data to be stored in a frame buffer by which a triangle 13a may be drawn on the screen, the screen coordinates of the vertices of the particular triangle are first determined from the world space coordinates. Once the vertices of a triangle have been defined in screen space, the individual pixels defining each triangle are determined by positioning the triangle in screen space using the known values at the vertices. FIG. 2 illustrates a scan line of pixels in screen space which describes a portion of the triangle. Each pixel defining the triangle is assigned a depth value, color values, and texture coordinates from the world space values. Since the triangle lies in a plane in world space, the depth values; the red, green, and blue color values; and the texture coordinates assigned at each of the three vertices each individually vary linearly from vertex to vertex.

Consequently, a linear interpolation process may be used to find the depth values, color values, and the texture coordinates in world space for any position in the triangle. Since world space amounts may be determined, depth values, color values, and texture coordinates in screen space for each pixel in the triangle may also be determined by applying perspective divide and projection algorithms to the values arrived at by linear interpolation of the world space depth values. Once the depth value, color values, and texture coordinates have been determined for each pixel, the texture coordinates are utilized to determine texture values from the texture map; and these texture values are utilized to modify the color values at each pixel defining the triangle.

Figure 3:
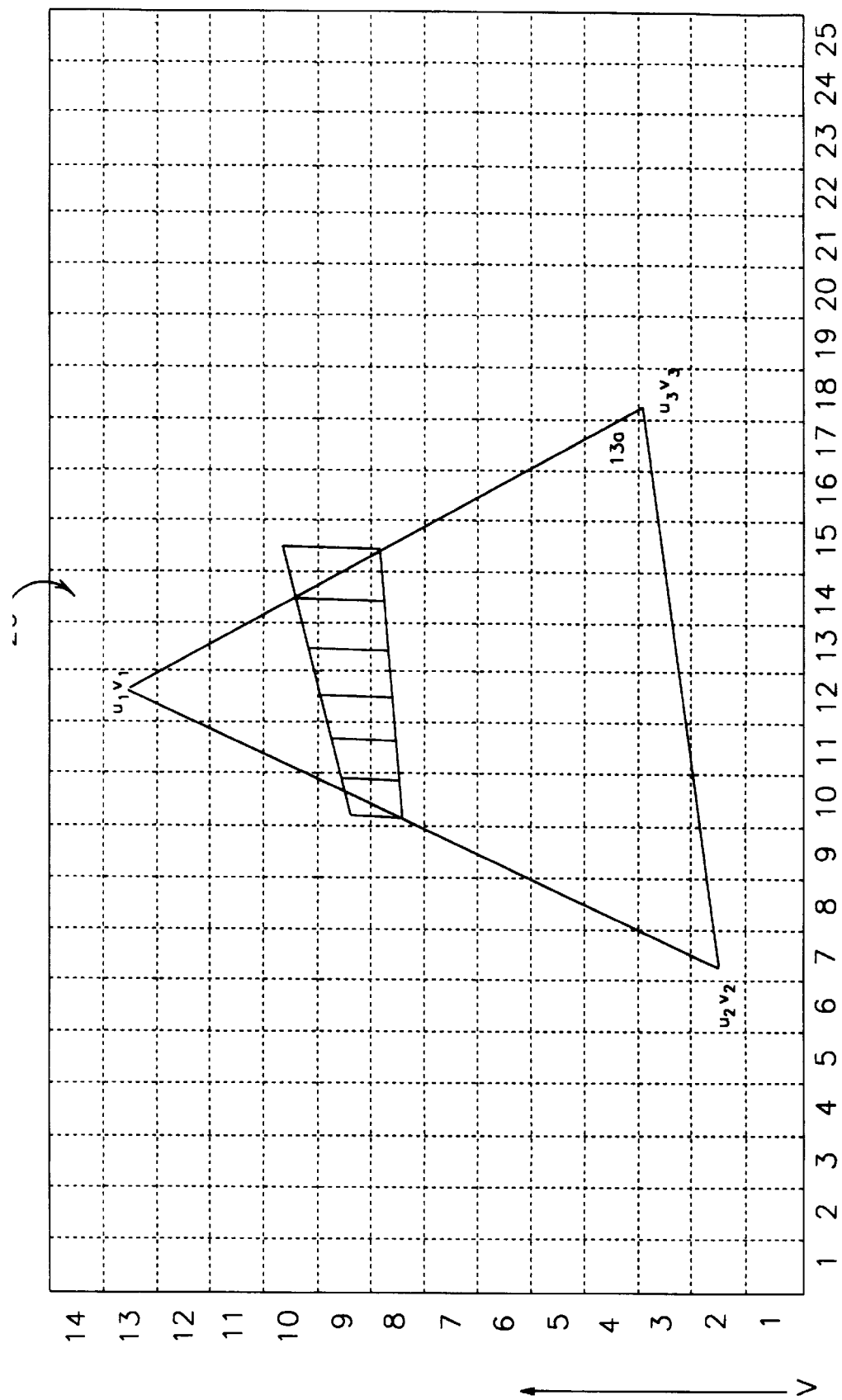
FIG. 3 illustrates the mapping of a polygon such as that illustrated in FIGS. 1 and 2 onto a texture map used to modify colors for shapes displayed on a computer display.
Figure 4:
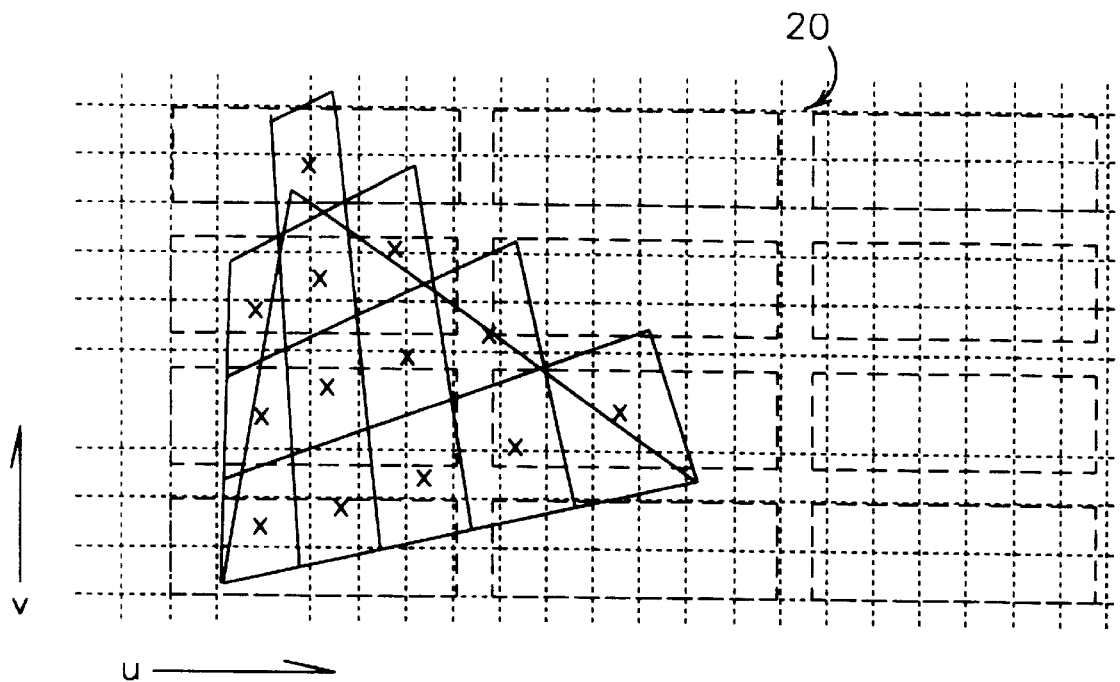
FIG. 4 is an enlargement of a portion of the texture map illustrated in FIG. 3.

The texture coordinates u and v of each vertex provide an index into a texture map (typically stored in memory) for a particular texture pattern which is to be described on the surface of the triangle 13a. FIG. 3 illustrates such a texture map 20 mapped to a triangle 13a lying in world space. Texture values may be determined for each pixel of the triangle 13a using the texture coordinates u and v provided for each vertex. The u and v coordinates provide access to a matrix of texture values which are illustrated by the dotted boxes of FIG. 3. In FIG. 3, the three sets of texture coordinates u and v are utilized to position the triangle 13a on the texture map 20 which shows texels as dotted rectangles. Solid lines illustrate the single scan line of pixels shown in FIG. 2 projected into world space onto the texture map. As may be visualized, if a texture map describes a brick wall, for example, then each individual screen pixel covers some portion of the texture map 20 and that portion may be used to derive from the texture map a value which when applied to modify the color values r, g, b for that pixel causes the surface of the triangle 13a to reflect the brick texture of the texture pattern 20. This is better illustrated in the enlarged FIG. 4 in which the texels of the texture map are outlined by dotted lines, the projected pixels describing the triangle are outlined by solid lines, and a brick texture defined by the texture map is shown in dashed lines.

The values of the u and v texture coordinates which are determined by the linear interpolation and perspective divide and projection algorithms are not usually integer values. On the other hand, indexing into a texture map is accomplished using integral coordinates. Consequently, non-integral coordinates obtained must somehow be used to obtain texture values. It is a complicated problem to derive texture values which accurately describe the texture at each pixel which covers the texture map. There are a number of methods used in the prior art to derive texture values from the u and v texture coordinates. A simple method uses the closest integral u and v values of each pixel to index into the texture map and then selects the value at that intersection. The closest integral values may be selected by rounding or truncating the u and v coordinates for the center of a pixel. As may be seen in FIG. 4 which is a view of a triangle positioned on a texture map in world space, this may cause a selection of values from the texture map which do not represent the texture well. The "x's" are each centered within the solid lines which depict a pixel projected into world space. If these "x's" are used to provide a texture value from the dotted lines indicating texels, the particular texels in which each "x" happens to fall does not necessarily produce the pattern of the texture very faithfully.

A more accurate method of representing the texture pattern utilizes the integer portion of the u and v texture coordinates determined for each pixel to index into the texture map, and then uses the fractional portion in a process called bilinear interpolation to provide weighted amounts of the texture values (texels) in the texture map closest surrounding the index point (typically the four closest values). These fractional portions are combined and blended into a more accurate representation for modifying the pixel color values to reproduce the texture pattern. Thus, each pixel is assigned a texture value from a combination of the texture values of the texels lying within the projection of that pixel on the texture map.

Figure 5:
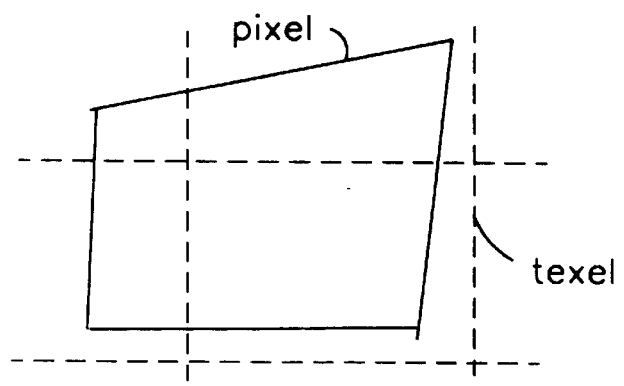
FIG. 5 is another enlargement of a portion of the texture map illustrated in FIG. 3 demonstrating pixel size versus texel size.
Figure 6:
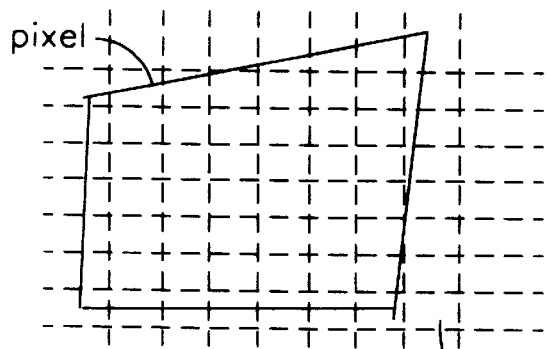
FIG. 6 is yet another enlargement of a portion of the texture map illustrated in FIG. 3 also demonstrating pixel size versus texel size.

Those skilled in the art will recognize that neither of these methods provides an accurate textural representation unless the size of the pixels rendered and the scale of the texture map used are related in a manner as such that a pixel covers a minimum number of texture values. FIG. 5 illustrates a mapping in which each projected pixel (solid line) covers some portion of four texels. If bilinear interpolation of the four surrounding texels is used to derive a texture value to be applied to modify the color of a pixel, then the representation of the texture is likely to be reasonably accurate. On the other hand, FIG. 6 illustrates a mapping in which each projected pixel covers a very large number of texels. If bilinear interpolation of the four surrounding texels is used to derive a texture value to be applied to a pixel, then the representation of the texture may not be very accurate at all since a large number of texel values which fall within the projected pixel are not used to determine the final texture value.

To correct for this problem, a technique which provides a plurality of texture maps representing the same texture pattern at a number of different scales has been used. For instance, scales might vary from 256+33256 to 1×1. By selecting a scale appropriate to the method of selection and to the number of pixels in a triangle 13a, a more appropriate assignment of texture values to pixels may be made. Thus, a texture map of a scale in which a number of texels is covered by a somewhat similar number of projected pixels (such as in FIG. 5) may be assigned to a particular triangle 13a and can provide a more accurate texture representation. It will be recognized that a texture map having a smaller number of texels will in such a case be used for applying texture to a triangle which occupies only a small number of pixels on the screen.

Each of these methods functions well in some circumstances. However, all of these methods are based on the construction of a rectilinear texture map accessed in rows and columns and a generally rectilinear pixel shape. The interpolation of values surrounding an index point reached by u and v coordinates is similarly based on assessing values provided from the rectilinearly organized texture map provided in the four positions closest to the index point generally at right angles to one another. This tends to provide accurate representations of textures (assuming a proper scale) when the pixels being rendered describe a textured surface which lies in a plane parallel to the surface of the screen so that an essentially rectangular pixel represents a rectangular portion of a texture map. However, as noted above, if the z values of the vertices of the triangle 13a differ, then the triangle is rendered on the screen in perspective. This means that a texture described on the surface of the triangle will similarly appear in perspective. Texture is not represented correctly for a surface at any significant perspective with any of the methods for texture mapping known to the prior art. It should be noted that shapes appearing in perspective constitutes the case most often encountered in rendering.

Figure 7:
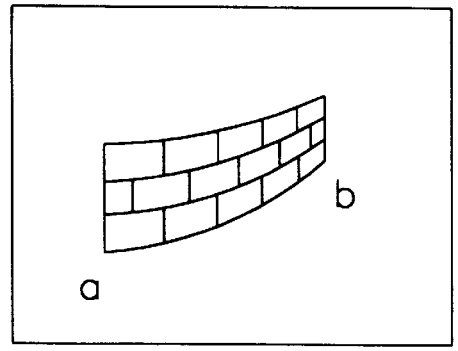
FIG. 7 illustrates a particular three dimensional shape which is to be displayed on a computer output display.

FIG. 7 illustrates a surface which appears in perspective and has a brick texture applied. As may be seen, each of the individual bricks in the texture is warped and distorted as compared to the rectangular shape of the bricks in the texture map illustrated in FIG. 4.

Figure 8:
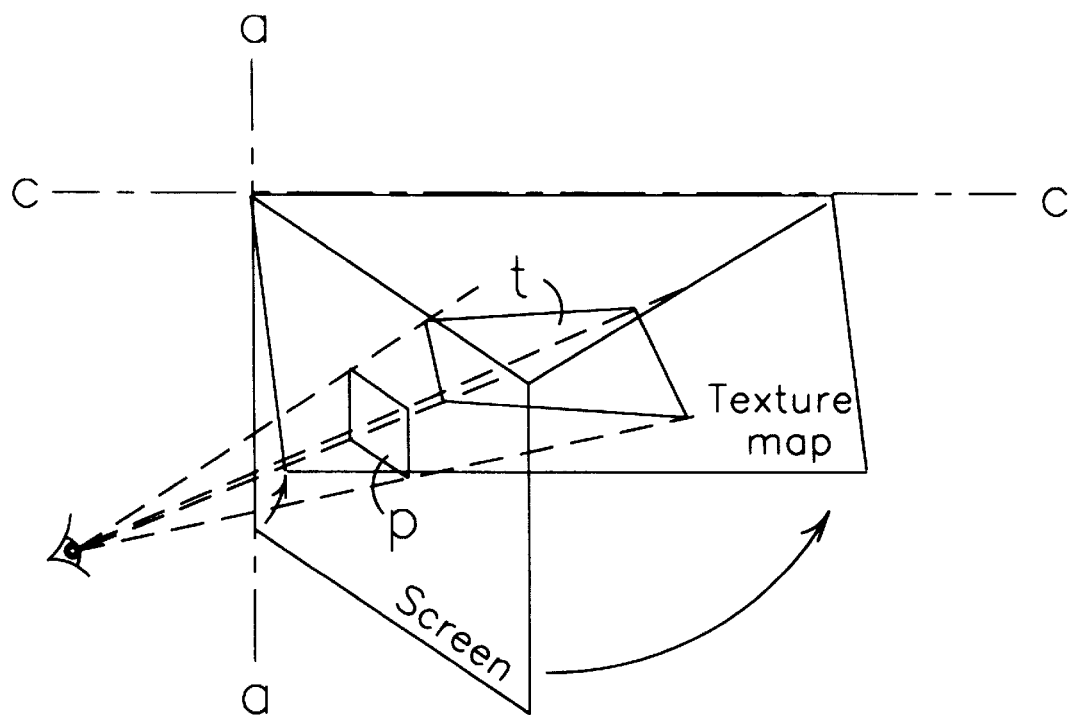
FIG. 8 illustrates the projection of a single pixel onto a texture map.

FIG. 8 illustrates how a single pixel is projected onto a texture map. Visualizing the manner in which this occurs will help in understanding the method of the present invention to determine texture values. In FIG. 8, the surface to which the texture is mapped is rotated back from the screen surface about an axis a—a at the left edge of the screen and is also rotated back on a second axis c—c. A series of lines from the viewing position of a user through the corners of an enlarged pixel p perpendicular to the screen surface intersect the surface and the texture map in a distorted shape t. It is the texture values within the pixel shape t which determine the ultimate texture value which should be used to modify the color values of the pixel p on the screen surface.

The present invention provides a new method for relating texture values to pixels which obviates the problem caused by perspective in rendering to the screen. Rather than utilizing methods which rely only on rectilinear processing, the present invention compares changes in texture map coordinates to the changes in screen coordinates for each pixel in a number of directions from the central position at which the pixel is mapped to the texture map in order to obtain a more accurate projection of each pixel onto the texture map.

Figure 9:
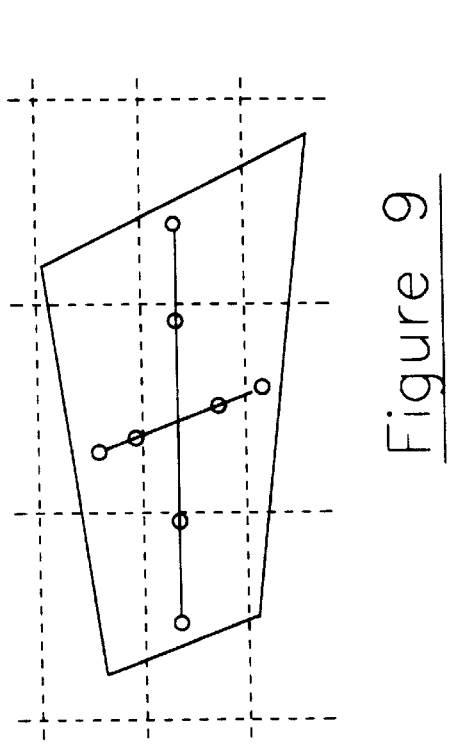
FIG. 9 illustrates a projection of the pixel shown in FIG. 8 onto a texture map.

This is accomplished in the present invention by comparing the change in u and v coordinates to the change in x and y coordinates which takes place for each pixel. It will be recalled that for each pixel, the x and y screen coordinates and the u and v texture coordinates at the center of the pixel are known or may be determined. With these values known, the values of texture coordinates at any position within a pixel may be estimated very accurately. Thus, texture coordinates may be accurately determined in each of four directions along the x-y axes of the pixel in screen space. When a pixel is projected onto the texture map as is shown in FIG. 9, it may be seen that the u and v coordinates change in a manner which depends on the relation of the texture map to the pixels which define the texture on the screen. Consequently, points related to the x and y axes of the pixel may be selected which together provide a more valid estimate of a texture value for that pixel than do prior art methods of selecting texture values. In FIG. 9, four points are selected which lie on each of the x and y axes of the pixel at a distance from the center selected to provide an accurate representation of the texture at the pixel. In the embodiments shown, the points are chosen to lie at a distance between the center and edge of the pixel selected to best describe the evaluation of the overall texture. Various criteria including the particular scale of texture map utilized effect this choice.

Although not necessary to the present invention in which any valid method of selecting a texture map scale may be used, the comparison of the u and v texture coordinate distance changes with the x and y pixel distance changes provides a very accurate method for the selection of a texture map having a scale which positions the pixel at the correct scale with respect to the texel size as discussed above. As will be seen, in some embodiments of the invention, the scale utilized may be varied from that used in the prior art because more texels may be included in the area bounded by a pixel than in prior art methods. This occurs because the method of the present invention may use the values of more texels to assess the texture value ascribed to a pixel.

The accuracy with which the changes of u and v with respect to x and y may be determined and used to provide a plurality of positions with relation to the x and y axes of the pixel projected onto the texture map from the mapped center of the pixel may be exploited in a number of ways. In one embodiment (FIG. 9), four new positions lying on the axes are selected at which u and v texture coordinates are determined. Since these points lie on the projected axes of the pixel, the points factor in the distortion that occurs to the pixel when its regular shape on the screen surface (square, rectangular, or oval) is projected onto a surface the corners of which lie at different depths in z space. The four positions of a projected pixel are illustrated by circles in FIG. 9 for the enlarged pixel of FIG. 8. Because these positions are reached by essentially comparing the rate of change of each of the u and v coordinates with respect to the rate of change of each of the x and y coordinates, the four new positions realistically describe the distorted form in which each pixel is mapped onto a texture map and provide the basis for a much more realistic assignment of texture values to modify pixel color values than do prior art methods.

In order to obtain these positions, the combination of the changes in u and v with respect to the changes of each of the x and y coordinates are used in one embodiment to determine four vectors along each of the x and y axes of a pixel in both the plus and minus directions; and a point is selected on each vector between the mapped central point and the pixel edge at a distance which is related to the rate of change. Obtaining points along these vectors causes texture values to be assessed in terms of the projection of the pixel onto the texture map rather than in terms of the rectangular arrangement of the texture map. Once the four points have been determined, different methods of determining texture values and blending those values may be utilized. In one case, the texture values at the four positions are simply obtained by selecting texture values using the truncated or rounded the texture the coordinates and blending (adding and averaging) the results obtained at the four points to provide a final texture value. In another embodiment, the texture coordinates obtained for each of the four points are individually utilized in a process of bilinear interpolation (as explained above) in which weighed values of texels surrounding each of the points are used to reach a texture value; then the results obtained at the four points are blended to provide a final texture value. In such a case, a texture map scale may be used which provides a larger number of texels within the area of each pixel since a large number of texels are used in the evaluation of the texture value for each pixel.

In other embodiments of the invention, larger numbers of points are selected at which texture coordinates are utilized to obtain texture values. For example, the texture values at more than four points within the projected image of each pixel may evaluated to increase the accuracy of the final texture value. FIG. 9 also illustrates the texture coordinates at eight points surrounding the center of a pixel utilized to obtain an overall texture value which provides a significantly more accurate texture representation of color for the pixel. Points may also be determined based on the same changes of u-v with respect to x-y in order to provide accurate texture coordinates by selecting a number of additional points on right angle projections in screen space at intervals along the original projections from the axes of the pixel (see FIG. 10). The texture coordinates u and v at each of these points may be truncated or rounded or, alternatively, subjected to bilinear interpolation to provide texture values. As with the previous embodiments, the plurality of texture values may then be blended to provide a final texture value for the pixel.

Similarly, twenty-four points surrounding the center of a pixel (for a total of twenty-five) may be determined by selecting two more positions on each axial projection from the center of each pixel and selecting points at the right angled projections in screen space from those points. Additional numbers of points may be selected in a similar manner to provide an number of points such as provide a accurate representation of the pixel texture color. When additional points are selected in such a manner, each of these points may be assigned a weight depending on its position in the grid which may in one embodiment be higher toward the center pixel position, and all of the weighted texture values at the points be blended (convolved).

Figure 10:
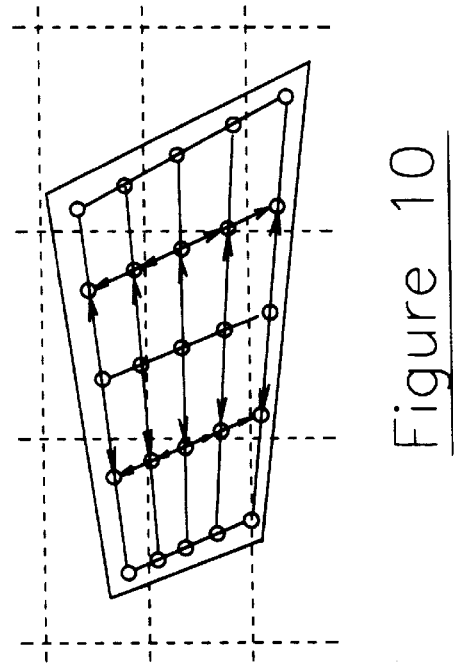
FIG. 10 illustrates another projection of the pixel shown in FIG. 8 onto a texture map.

In these embodiments, a grid of points is produced (such as is shown in FIGS. 9 and 10) surrounding the projected center of the pixel which points describe the projected pixel on the texture map from which texture values are determined. A particular level of accuracy is offset by the slowing of the rate to process the texture value when texture values are evaluated at a large number of points.

It should be noted that it is also possible to apply a randomizing algorithm to the number of pixels selected in a particular pattern used to evaluate a texture value for a pixel. Applying such a randomizing algorithm to select only certain of the points should make the texture values sufficiently different to relieve any blockiness.

In order to accomplish the method of this invention, the x, y, and z world space coordinates and the u and v texture map coordinates of a triangle are used to generate the x, y, and z screen coordinates and the u and v texture map coordinates of each pixel using typical prior art methods or methods described herein. The size of the texels as determined from the u and v coordinates with respect to the size of the pixels as determined from x, y, z coordinates is used to select a texture map of the correct scale for the particular technique to be used (i.e., the number of individual texels sampled within a pixel). With a texture map of the correct scale, the changes of the u and v coordinates with respect to the x and y coordinates along the selected projected axes on the texture map may be determined. These are used to determine the texture coordinates at the four points (or other number of points) along the axes of the pixel (or on lines projecting therefrom) projected onto the texture map. The texture values are determined at each of these plurality of points (or larger number as in FIGS. 9 and 10) by bilinear interpolation or some other process. These values may then be weighted, especially where part of a grid such as is illustrated in FIG. 10. Then these values are blended to produce a texture value for the pixel. The texture value is then applied to the color value obtained for the particular pixel in the manner described above.

Figure 11:
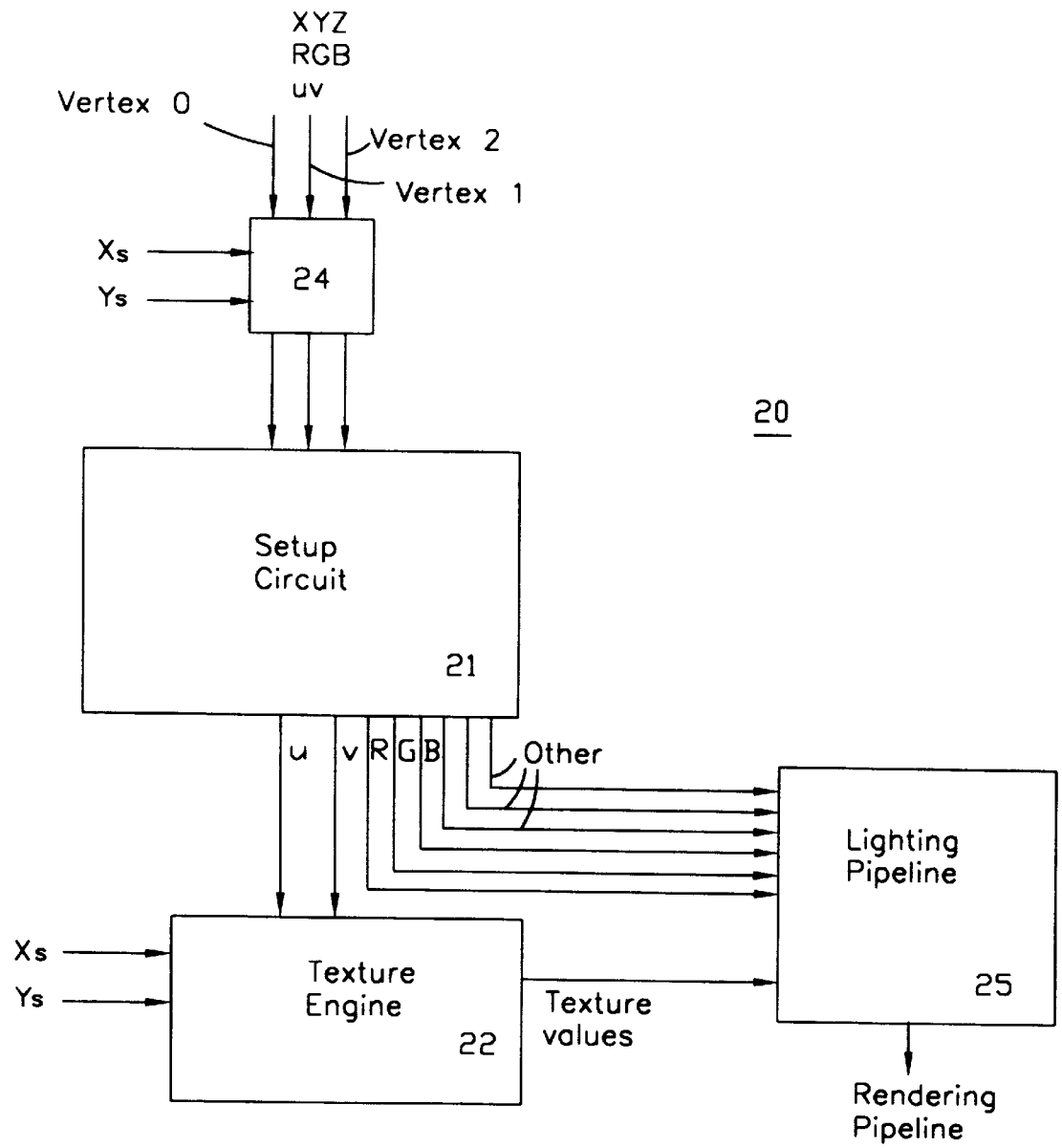
FIG. 11 is a block diagram of a circuit designed in accordance with the present invention.

FIG. 11 is a block diagram illustrating a circuit 20 for carrying out the present invention. The circuit 20 includes a setup engine 21 which receives as inputs values for the various attributes defining the three vertices of any triangular surface being depicted. Before transfer to the setup engine 21, the x, y, u, and v values at the vertices of the triangle are processed by a scaling circuit 24 which receives the x, y, u, and v values at the vertices of the triangle and utilizes the maximum and minimum values of each to determine a scale for a texture map in the manner described above. The x, y, and z coordinates may be provided by an application program as either screen space or world space values. The change from one to the other is based on a perspective transformation process utilizing the following equations for conversion:

$$Xs = (H/S)*(X/Z); \quad /*-1.0 \text{ to } 1.0 \quad */$$
$$Ys = (H/S)*(Y/Z); \quad /*-1.0 \text{ to } 1.0 \quad */$$
$$M = (H/S)*(1/Z); \quad /*1/S \text{ to } H/S/F \quad */$$

where, H is the distance from the viewer to the center of the screen; S is half of either the width or height of the screen; F is the distance from the eye to the far clip plane, and the field of view in degrees is 2*arctangent (S/H).

The circuit 21 utilizes the x, y, and z screen values to determine screen values for each of the attributes. One particular process of computing perspective-correct screen values for the attributes from world space vertex values is expressed in the geometric relationship:

$$E_s=(AX+BY+C)/(DX+EY+F),$$

where $E_2$ is the screen value of the particular attribute at the pixel defined by the X Y coordinates; and A, B, C, D, E, and F are constants over the triangle which depend on various dimensions of the triangle in screen and world space and the values of the attributes at the vertices in world space.

One specific sequence of operations which provides accurate perspective translations rapidly from world space to screen space for a number of attributes when the values X and Y in the basic formula are screen values is as follows:

Where:

---

A, B, C, D, E, F are the coefficients of the basic relationship

| | |
|---|---|
| Xs0, Xs1, Xs2 | Screen Coordinates of vertices |
| Ys0, Ys1, Ys2 | Screen Coordinates of vertices |
| Zs0, Zs1, Zs2 | Screen Z Buffer Coordinates of vertices |
| M0, M1, M2 | Screen Z Buffer Coordinates of vertices |
| R0, R1, R2 | World Red Lighting of vertices |
| G0, G1, G2 | World Green Lighting of vertices |
| B0, B1, B2 | World Blue Lighting of vertices |
| U0, U1, U2 | Texture Coordinates of vertices |
| V0, V1, V2 | Texture Coordinates of vertices |

Input: Xs, Ys    Screen Coordinates of pixels

Triangle Presetup

| | |
|---|---|
| ad0 = Ys1−Ys2; | psu0 = Xs1*Ys2; |
| ad1 = Ys2−Ys0; | psu1 = Xs2*Ys1; |
| ad2 = Ys0−Ys1; | psu2 = Xs2*Ys0; |
| be0 = Xs2−Xs1; | psu3 = Xs0*Ys2; |
| be1 = Xs0−Xs2; | psu4 = Xs0*Ys1; |
| be2 = Xs1−Xs0; | psu5 = Xs1*Ys0; |
| cf0 = psu0−psu1; | adm0 = ad0*M0; |
| cf1 = psu2−psu3; | adm1 = ad1*M1; |
| cf2 = psu4−psu5; | adm2 = ad2*M2; |
| | bem0 = be0*M0; |
| | bem1 = be1*M1; |
| | bem2 = be2*M2; |
| | cfm0 = cf0*M0; |
| | cfm1 = cf1*M1; |
| | cfm2 = cf2*M2. |

Triangle Setup

D = adm0    + adm1    + adm2;
E = bem0    + bem1 + bem2;
F = cfm0    + cfm1    + cfm2;
Zz = cf0       + cf1 + cf2;
Az = ad0*Zs0 + ad1*Zs1 + ad2*Zs2;
Bz = be0*Zs0 + be1*Zs1 + be2*Zs2;
Cz = cf0*Zs0 + cf1*Zs1 + cf2*Zs2;

-continued

```
Au = adm0*U0 + adm1*U1 + adm2*U2;
Bu = bem0*U0 + bem1*U1 + bem2*U2;
Cu = cfm0*U0 + cfm1*U1 + cfm2*U2;
Av = adm0*V0 + adm1*V1 + adm2*V2;
Bv = bem0*V0 + bem1*V1 + bem2*V2;
Cv = cfm0*V0 + cfm1*V1 + cfm2*V2;
Ar = adm0*R0 + adm1*R1 + adm2*R2;
Br = bem0*R0 + bem1*R1 + bem2*R2;
Cr = cfm0*R0 + cfm1*R1 + cfm2*R2;
Ag = adm0*G0 + adm1*G1 + adm2*G2;
Bg = bem0*G0 + bem1*G1 + bem2*G2;
Cg = cfm0*G0 + cfm1*G1 + cfm2*G2;
Ab = adm0*B0 + adm1*B1 + adm2*B2;
Bb = bem0*B0 + bem1*B1 + bem2*B2;
Cb = cfm0*B0 + cfm1*B1 + cfm2*B2;
Per Pixel operations:

Dd = D *Xs + E *Ys + F;
Zn = (Az*Xs + Bz*Ys + Cz)/Zz; /*screen*/
Zn = (                   Zz)/Dd; /*world*/
Un = (Au*Xs + Bu*Ys + Cu)/Dd;
Vn = (Av*Xs + Bv*Ys + Cv)/Dd;
Rn = (Ar*Xs + Br*Ys + Cr)/Dd;
Gn = (Ag*Xs + Bg*Ys + Cg)/Dd;
Bn = (Ab*Xs + Bb*Ys + Cb)/Dd;
```

As will be understood by those skilled in the art, this sequence of steps may be implemented by well known gating circuitry which carries out the addition, subtraction, multiplication, and division steps indicated to produce perspective correct screen values for each of the attributes at each pixel position.

The texture coordinates provided by the setup engine 21 are transferred to a texture engine 22. The texture engine 22 utilizes those input values to determine texture coordinates at a plurality of positions within each pixel in accordance with the foregoing discussion of the invention. The texture engine 22 then translates the texture coordinates at each of the plurality of positions within a pixel into texture values at those positions in accordance with the invention and blends the texture values to realize a final texture value for the pixel. This final texture value is transferred to a rendering pipeline 23 where the texture value and the other various attributes are utilized to modify the color value of the particular pixel in the sequence of pixels utilized to describe the triangle.

Figure 12:
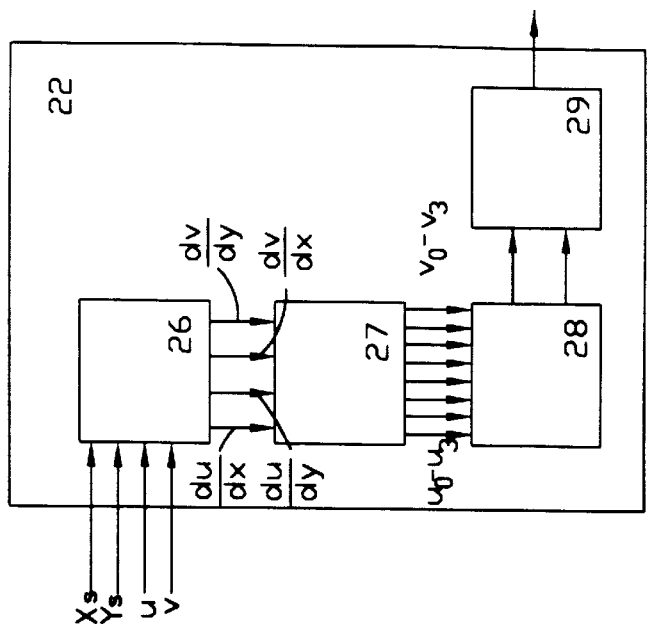
FIG. 12 is a block diagram of a particular embodiment of a portion of the circuit of FIG. 12.

FIG. 12 is a block diagram illustrating one embodiment of a texture engine 22 designed in accordance with the invention to produce texture values at four positions within each pixel and blend those values to produce a final texture value. The texture engine 22 includes a circuit 26 which receives the u and v texture coordinates computed at each pixel of the triangle and determines the change of each u and v value with respect to the change of the x and y values for each pixel. In one embodiment in accordance with the invention, this is accomplished by gating circuitry for carrying out the following equations to determine the derivatives of each value at each pixel:

$$du/dx=[(Au)/(DX+EX+F)]-[(AuX+BuY+Cu)D/(DX+EY+F)^2],$$

$$du/dy=[(Bu)/(DX+EX+F)]-[(AuX+BuY+Cu)E/(DX+EY+F)^2],$$

$$dv/dx=[(Av)/(DX+EX+F)]-[(AvX+BvY+Cv)D/(DX+EY+F)^2],$$

$$dv/dy=[(Bv)/(DX+EX+F)]-[(AvX+BvY+Cv)E/(DX+EY+F)^2],$$

where the coefficients are those described above.

The results produced are provided as input values to a circuit 27 which produces u and v values at four positions in accordance with the equations:

$$u0=u-(du/dx)*S, \quad v0=v-(dv/dx)*S,$$

$$u1=u+(du/dx)*S, \quad v1=v+(dv/dx)*S,$$

$$u2=u-(du/dy)*S, \quad v2=v-(dv/dy)*S,$$

$$u3=u-(du/dy)*S, \quad v1=v+(dv/dy)*S,$$

where S is the scaling factor determined.

The u and v values at the four positions are transferred to a circuit 28 which in a first embodiment bilinearly interpolates the texture coordinates at the four positions to provide four texture values. The bilinear interpolation process in the first embodiment of such a circuit utilizes the integer portion of the u and v texture coordinate values at each position to produce a total of four sets of texture coordinate pairs at each position as follows: u/v, u+1/v, u/v+1, and u+1/v+1, where u and v are the coordinates. These sets of coordinates are used to find four texture values which are weighted using the non-integral portion of each coordinate set and combined. The texture values determined for the four positions about the pixel center are averaged to reach a final texture value.

A second embodiment of a circuit 28 truncates the u and v texture coordinates at the center of each pixel to determine four positions as follows: $u_{trunc}/v_{trunc}$ $(u_{trunc}+1)/v_{trunc}$, $u_{trunc}/(v_{trunc}+1)$, and $(u_{trunc}+1)/(v_{trunc}+1)$. Texture values are determined at each of the four positions. These texture values at the four positions are weighted based on the non-integral portion and blended by a circuit 29 to provide a final texture value for the pixel.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer display system, a method for mapping textures to three dimensional surfaces divided into a one or more polygons, comprising the steps of:

determining pixels to be utilized in describing a polygon from distance coordinates of vertices of a polygon, selecting a texture map having a scale chosen to accurately reproduce a texture value for said pixels of the polygon, determining a plurality of texture coordinates for each said pixel at a plurality of positions surrounding a center of the pixel and lying on a grid defined by x and y axes of pixels in screen space and right angle projections therefrom, for each said pixel, determining texture values at each of the positions except for some positions that are randomly excluded from evaluation, and for each sad pixel, blending the determined texture values at said positions to produce a texture value for the pixel.

2. A method as claimed in claim 1 in which texture coordinates are chosen at four positions.

3. A method as claimed in claim 1 in which bilinear interpolation is used to determine texture values at each of the determined positions.

4. A method as claimed in claim 1 in which the texture coordinates are converted to integral values to determine texture values at each of the determined positions.

5. A method as claimed in claim 1 in which texture coordinates are chosen at eight positions.

6. A method as claimed in claim 1 in which texture coordinates are chosen at sixteen positions.

7. A method as claimed in claim 1 in which texture coordinates are chosen at thirty-two positions.

8. A method as claimed in claim 1 in which a texture map is selected by relating the change in pixel screen coordinates to screen texture coordinates of pixels.

9. A method as claimed in claim 8 in which a texture map is chosen having a scale selected to evaluate a majority of texels mapped to a pixel.

10. A method as claimed in claim 1 in which texture values at each of the positions are weighted during blending.

11. In a computer display system, a method for mapping textures to three dimensional surfaces, comprising the steps of:

dividing a surface into polygons representing the surface in world space, translating three dimensional world space coordinates of vertices of each polygon to screen coordinates of vertices of the polygon, determining two dimensional screen coordinates of pixels to be utilized in describing each polygon from screen coordinates of vertices of the polygon, determining depth dimensions, color values, and texture coordinates of pixels to be utilized in describing each polygon from depth dimensions, color values, and texture coordinates of vertices of the polygon in world space, selecting a scale for a texture map to reproduce a texture across each polygon, selecting a plurality of points surrounding the center of each said pixel and lying on a grid defined by x and y of axes of pixels in screen space and right angle projections therefrom, and which accurately represent the relationship of the pixel and the texture map, determining texture values at each of the selected points for each pixel; and convolving the texture values at the selected points for each said pixel to produce a texture value for the pixel.

12. A method as claimed in claim 11 in which four points are chosen.

13. A method as claimed in claim 11 in which eight points are chosen.

14. A method as claimed in claim 11 in which sixteen points are chosen.

15. A method as claimed in claim 11 in which thirty-two points are chosen.

16. A method as claimed in claim 11 which random points are excluded from evaluation.

17. A method as claimed in claim 11 which the step of determining texture values at each points includes:

using the texture coordinates and screen two dimensional coordinates of pixels to be utilized in describing the polygon to determine texture coordinates at each point, and bilinearly interpolating texture coordinates at each point to determine texture values at each of the points.

18. A method as claimed in claim 11 in which the step of determining texture values at each points includes:

using the texture coordinates and screen two dimensional coordinates of pixels to be utilized in describing the polygon to determine texture coordinates at each point, and converting the texture coordinates to integral values to determine texture values at each of the points.

19. A method as claimed in claim 11 in which texture values at each of the points are weighted while convolving.

20. A method as claimed in claim 11 in which a scale for a texture map is selected by relating changes in pixel screen coordinates to screen texture coordinates of pixels.

21. A method as claimed in claim 20 in which a texture map is chosen having a scale selected to evaluate a majority of texels mapped to a pixel.

22. A texture mapping circuit for three dimensional surfaces divided into polygons, comprising:

a circuit responsive to texture and distance coordinates of polygon vertices to determining a scale for a texture map, a circuit responsive to screen texture and distance coordinates of polygon vertices for determining a plurality of texture coordinates at a plurality of positions surrounding a center of each pixel used in describing a particular polygon, wherein various ones of the surrounding positions lie on a grid defined by x and y axes of pixels in screen space and right angle projections therefrom, circuit for determining texture values at each of the plurality of surrounding positions, and a blending circuit responsive to the texture values at the surrounding positions of each pixel to produce a final texture value for the pixel.

23. A texture mapping circuit as claimed in claim 22 in which the circuit responsive to screen texture and distance coordinates of vertices for determining a plurality of texture coordinates of a pixel at a plurality of positions surrounding a center of the pixel determines coordinates at four positions.

24. A texture mapping circuit as claimed in claim 22 in which the positions lie on a grid defined by x and y axes of pixels in screen space.

25. A texture mapping circuit as claimed in claim 22 in which the positions lie on a grid defined by x and y axes of pixels in screen space and right angle projections therefrom.

26. A texture mapping circuit as claimed in claim 22 in which bilinear interpolation is used to determine texture values at each of the surrounding positions.

27. A texture mapping circuit as claimed in claim 22 in which the texture coordinates are converted to integral values to determine texture values at each of the surrounding positions.

28. A texture mapping circuit as claimed in claim 22 in which texture coordinates are chosen at eight surrounding positions.

29. A texture mapping circuit as claimed in claim 22 in which texture coordinates are chosen at sixteen surrounding positions.

30. A texture mapping circuit as claimed in claim 22 in which texture coordinates are chosen at thirty-two surrounding positions.

31. A texture mapping circuit as claimed in claim 22 in which a texture map of the correct scale is selected by relating the change in pixel screen coordinates to screen texture coordinates of pixels.

32. A method as claimed in claim 22 in which the circuit responsive to texture and distance coordinates of vertices to determine a scale for a texture map chooses a scale selected to evaluate a majority of texels mapped to a pixel.

* * * * *